US009146907B1

(12) United States Patent
Joshi et al.

(10) Patent No.: US 9,146,907 B1
(45) Date of Patent: Sep. 29, 2015

(54) SYSTEMS AND METHODS PROVIDING PARAMETERS FOR MODIFYING A FONT

(71) Applicant: AMAZON TECHNOLOGIES, INC., Reno, NV (US)

(72) Inventors: Lokesh Joshi, Mercer Island, WA (US); Mohammad Kanso, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/219,770

(22) Filed: Mar. 19, 2014

(51) Int. Cl.
*G06F 17/21* (2006.01)
*G06K 15/02* (2006.01)

(52) U.S. Cl.
CPC .......... *G06F 17/214* (2013.01); *G06K 15/1827* (2013.01)

(58) Field of Classification Search
None
See application file for complete search history.

(56) References Cited

U.S. PATENT DOCUMENTS

| | | | | |
|---|---|---|---|---|
| 5,586,241 A | * | 12/1996 | Bauermeister et al. | 345/467 |
| 6,678,410 B1 | * | 1/2004 | Phinney et al. | 382/181 |
| 2004/0140977 A1 | * | 7/2004 | Hakamada | 345/467 |
| 2004/0179044 A1 | * | 9/2004 | Carter et al. | 345/865 |
| 2007/0195096 A1 | * | 8/2007 | Voorhees et al. | 345/467 |

* cited by examiner

*Primary Examiner* — Maurice L McDowell, Jr.
(74) *Attorney, Agent, or Firm* — Lindauer Law, PLLC

(57) ABSTRACT

Media devices display content with fonts that contain sets of glyphs such as letters. Described herein are systems, devices, and methods for providing parameters for modifying a font. The modification of the font may increase readability for users of the media devices. The parameters may be determined based on at least one of an analysis of the content or an analysis of existing fonts and modifications already made to the existing fonts.

20 Claims, 10 Drawing Sheets

SYSTEMS AND METHODS PROVIDING PARAMETERS FOR MODIFYING A FONT

BACKGROUND

Media devices may display different fonts including glyphs having certain styles and sizes. The glyphs may be designed having certain features such as heights, widths, slants, weights, and so forth. For some users of the media devices (e.g., users having dyslexia, low vision, and so forth), certain glyphs may result in poor readability and legibility. Various factors such as the design features and the arrangement of the glyphs may decrease readability and legibility of text.

Figure 1:
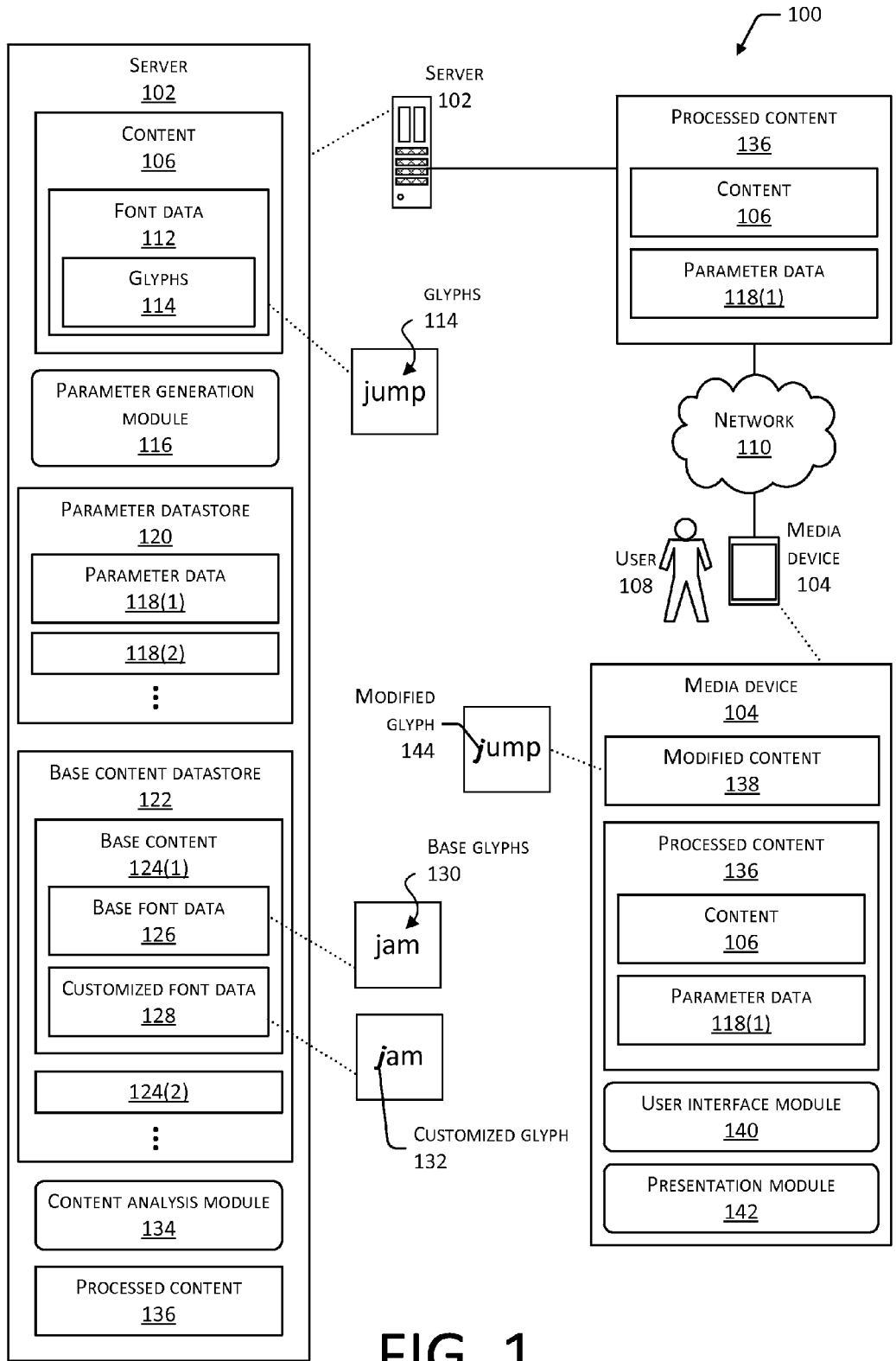
FIG. 1 is an illustrative system providing processed content for displaying modified content.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media devices may display different fonts that include glyphs displayed with certain styles and sizes. The glyphs may be designed having certain features such as heights, widths, slants, weights, and so forth. For some users of the media devices (e.g., users having dyslexia), certain glyphs may result in poor readability and legibility. For example, certain letters may look similar such as the letter "j" and the letter "i", or the letter "h" and the letter "n". The position of glyphs relative to one another may also decrease readability. For example, some users may confuse the letters "rn" as an "m". This disclosure describes systems and methods for modifying glyphs to increase readability and legibility.

The system may include one or more servers communicatively connected to one or more media devices. The media devices may include televisions, set-top boxes, tablet computers, personal computers, gaming consoles, in-vehicle entertainment systems, portable media players, and so forth. The media devices may be configured to present content that may include font data, electronic book data, audio data, video data, application data, game data, and so forth.

The server may be configured to access content. In one example, the server accesses the content once a publisher uploads an electronic book to the server. The font data of the electronic book may include glyphs expressed as signs, symbols, phonemes, numbers, or letters. The glyphs may have shapes and may be positioned at distances relative to one another. The glyphs may comprise various scripts. For example, the glyphs may comprise at least one of Arabic, Chinese, Cyrillic, Devanagari, Greek, Hebrew, Japanese, Korean, Latin, Malay, Tamil, Telugu, Thai, or Urdu script.

The server may generate parameter data comprising parameters used to modify the glyphs of the content. The parameter data may include one or more parameters stored in a parameter table. The media device may use one or more parameters to modify one or more glyphs.

A parameter datastore may be configured to store different parameter data used with different content. The parameter datastore may comprise a data structure which is stored on one or more memory devices. The server may or may not include the parameter datastore.

The server may be configured to generate the parameter data by analyzing base content. The base content may comprise text data such as an electronic book. The text of the electronic book may be described as base glyphs expressed as signs, symbols, or letters. The server may receive the base content data in response to a publisher uploading the electronic book to the server. In some implementations, the base content data may comprise other data such as audio data, video data, application data, game data, and so forth. A base content datastore may be configured to store different base content data. The base content datastore may comprise a data structure which is stored on one or more memory devices. The server may or may not include the base content datastore.

The base content data may include base font data and customized font data. The base font data may comprise information causing the base glyphs to be displayed with a first font, and the customized font data may comprise information causing the base glyphs to be displayed with a customized font. The customized font may be designed by a font designer. In one example, for a particular base content data, the base font data may cause the letter "O" to be displayed having a first width, and the customized font data may cause the letter "O" to be displayed having a second width. In another example, the base font data may cause a first letter to be positioned at a first distance from a second letter, and the customized font data may cause the first letter to be positioned at a second, larger distance from the second letter.

The server may generate the parameter data by analyzing the base content data. Analyzing the base content data may include determining the differences between the base glyphs of the base font content and the glyphs of the customized font data. A comparison of these glyphs may indicate various differences such as differences in the outline of a glyph, differences in the color of the glyphs, differences in the orientation of the glyphs, and so forth. The parameter data may comprise information that, when applied to content, causes the content to change. For example, the application of first parameter data may cause the letter "j" to be displayed at an angle when compared with the display of the letter "j" when the first parameter data is not applied. For some users, displaying the letter "j" at an angle may improve readability because it may be easier for the users to distinguish the letter "j" at an angle from the letter "i".

The server may be configured to generate processed content. The processed content may comprise a particular content (e.g., a particular electronic book) and particular parameter data. The generation of the processed content may include selecting certain parameter data from the parameter datastore. The selection of the parameter data may be based on a comparison of a particular piece of content with the base content data stored in the base content datastore. In one example, the server selects first parameter data in response to a determination that the glyphs of a particular content match or substantially match a set of base glyphs of a particular base content. For example, the outline of one or more content glyphs of the content may match the outline of one or more base glyphs of the base content data.

Once the processed content is generated for a particular content, the server may store the processed content. In one example, the server stores the processed content in a datastore configured to store different processed content. The server may physically incorporate the database or the database may be externally placed. In one example, the server provides a particular processed content to the media device in response to receiving, from the media device, a request for a particular electronic book.

The server may be configured to provide the processed content to one or more media devices. The server may provide the processed content to a particular media device in response to receiving a request from the media device.

The media device is configured to present content. Once the media device receives the processed content, the media device may present the content or the modified content. The media device may generate modified content by applying the parameter data to the content. The application of the parameters to the content may cause the presentation of the content to change in various ways. For example, the outline of glyphs may change, the colors of the glyphs may change, the orientation of the glyphs may change, and so forth.

Modifying features of fonts may improve the reading experience for users such as dyslexic readers. By analyzing the content and generating parameter data for the content, users of the media devices may view modified content, which may improve readability of the content.

Illustrative System

FIG. 1 is an illustrative system 100 generating processed content for displaying modified content. The system 100 includes at least one server 102 communicatively connected to at least one media device 104. While a single server 102 is depicted, in some implementations, the server 102 or the functions attributed to the server 102 may be provided by a plurality of devices. For example, the server 102 may exist as a virtualized server executing across a plurality of physical servers.

The media devices 104 may include a variety of devices, such as a mobile digital device, a smartphone, a tablet computer, a desktop computer, a laptop computer, a television, an electronic book ("eBook") reader, a gaming console, a set-top box, a media player, an in-vehicle communication system, a wearable computing device, and so forth. The media device 104 includes or is communicatively coupled to one or more display output devices suitable for presenting content 106 such as an electronic book.

The media device 104 may be coupled to a remote control using a communication link. The remote control may serve as an input device or input/output device for the media device 104. For example, the remote control may include one or more of a touch sensor, button, accelerometer, gyroscope, camera, microphone, speaker, haptic output device, and so forth. The communication link may be optical, radio frequency, acoustic, and so forth. In one implementation the communication link may use a personal area network interface, such as one compliant with the Bluetooth® specification. In some implementations, the remote control may comprise another device such as a smartphone, tablet computer, and so forth which is communicatively coupled to the media device 104.

A user 108 is depicted with the media device 104. While a single user 108 and a single media device 104 are shown, more than one user 108 may consume the content 106 at a given time, such as where multiple users 108 are reading an electronic document together.

The server 102 may be communicatively connected with the media device 104 using a network 110. The network 110 may include a variety of networks, such as a local network, a wide area network ("WAN"), broadcast network, a personal area network, a wired and wireless local area network ("LAN"), and so forth. In some implementations, the network 110 includes at least one of Ethernet, Wi-Fi™ as promulgated by the Wi-Fi Alliance, 3G and 4G, Bluetooth® as promulgated by the Bluetooth Special Interest Group, and so forth. In some implementations, the devices and systems described herein are configured to directly connect to each other. The system 100 may include additional servers (not shown) which communicate with one or more media devices 104.

The content 106 may comprise electronic book data. The content 106 may include font data 112 that includes glyphs 114 expressed as signs, symbols, or letters. In the example depicted in FIG. 1, the content 106 includes four glyphs 114 that spell the word "jump." The word "jump" may be one word from an electronic book including a relatively large amount of words. The server 102 may be configured to receive electronic books from publishers by enabling publishers to upload the electronics books. In some implementations, the content 106 includes other data such as at least one of audio data, video data, application data, game data, and so forth.

The server 102 may include a parameter generation module 116 configured to generate parameter data 118. The parameter data 118 may comprise parameters that are used by the media device 104 to modify the presentation of the content 106. As described in more detail below with regard to FIG. 2, the parameter data 118 may include a parameter table having multiple parameters used to modify one or more glyphs 114. The parameter data 118(1), 116(2), . . . , 116(P) may be stored in a parameter datastore 120. As used in this disclosure, letters in parenthesis such as "(P)" indicate an integer value. The parameter datastore 120 may comprise a data structure which is stored on one or more memory devices. The parameter datastore 120 may be physically incorporated with the server 102 or externally placed.

The server 102 may include a base content datastore 122 configured to store base content 124(1), 122(2), . . . 122(B). The base content 124 may comprise electronic book data, audio data, video data, application data, game data, and so forth. In one example, the base content 124 comprises an electronic book. The text of the electronic book may be described as glyphs expressed as signs, symbols, or letters. The base content 124 may be received in response to a publisher uploading electronic books.

The glyphs included in the base content 124 may be displayed using different fonts. For example, the base content 124 may include base font data 126 comprising information causing the glyphs to be expressed using a first font, and customized font data 128 comprising information causing the glyphs to be expressed using a second font. For example, for width of a glyph "O", the base font data 126 may cause a lower portion of the glyph "O" to have a first thickness, and the customized font data 128 may cause the lower portion of width of the glyph "O" to have a second, larger thickness.

In the example depicted in FIG. 1, the base font data 126 includes three base glyphs 130 that spell the word "jam". The word "jam" may be one word from an electronic book including a relatively large amount of words. The customized font data 128 includes glyphs that include at least one customized glyph 132. In this example, the customized glyph 132 is depicted as the letter "j". When compared with the letter "j" of the base glyphs 130, the customized glyph 132 is depicted as being slanted and made bold. In this example, the letter "j" may have been customized by a font designer to emphasize the difference between the letter "j" and the letter "i". The font designer may customize the letter "j" because some users 108 (e.g., users with dyslexia) may have difficulty interpreting the difference between the letter "j" and the letter "i".

While the customization of the base glyph 130 described above included rotating and bolding the glyph, the base glyphs 130 may be customized in various other ways. For example, a comparison of the base glyphs 130 and the customized glyphs 132 may indicate various changes in the outline of a glyph, changes in the spacing between the glyphs, changes in the color of the glyphs, and so forth.

The parameter generation module 116 may generate the parameter data 118 by analyzing the base content 124. Analyzing the base content 124 may include comparing the base glyphs 130 with the customized glyphs 132. For example, an analysis of the base content 124(1) may indicate that the letter "j" has been customized such that each occurrence of the letter "j" is displayed having a rotation and having a bold font when compared to the letter "j" of the base glyphs 130. The parameter data 118(1) may comprise information that, when applied to the letter "j", causes each "j" to be rotated and displayed using bold font.

The server 102 may include a content analysis module 134 configured to generate processed content 136. The processed content 136 may comprise the content 106 and one or more parameter data 118. As described in more detail below, the media device 104 may use the processed content 136 to generate modified content 138.

The generation of the processed content 136 may include selecting one or more of the parameter data 118(1), 118(2), ... 118(P). The selection of the parameter data 118 may be based on a comparison of the content 106 with the base content 124(1), 124(2), ... 124(B). In one example, the content analysis module 134 selects the parameter data 118(1) in response to a determination that the glyphs 114 of the content 106 match or substantially match a set of base glyphs 130 of a particular base content 124. For example, the outline of a glyph 114 may match the outline of a base glyph 130.

Once the processed content 136 is generated for a particular content 106, the server 102 may store the processed content 136 in, for example, a database configured to store different processed content 136. The server 102 may physically incorporate the database or the database may be externally placed.

The server 102 may provide the processed content 136 to one or more media devices 104 using the network 110. In one example, the server 102 provides the processed content 136 to the media device 104 in response to receiving, from the media device 104, a request for a particular electronic book. The media device 104 may include a user interface module 140 configured to provide a user interface to the user 108 or to the media device 104. In one implementation, the user interface may be a web interface presented via the network 110 and accessible to the users 108. In another implementation the user interface may comprise an application programming interface ("API") which enables communication such as sending requests for content 106 from the media device 104 to the server 102.

The media device 104 may include a presentation module 142 configured to present content 106 or the modified content 138 on, or in conjunction with, the media device 104. The presentation module 142 may be configured to receive the processed content 136 from an external source device such as the server 102, another media device 104, and so forth. The presentation module 142 may support digital rights management, presentation of encrypted content, and so forth. The presentation module 142 may be configured to work in conjunction with the user interface module 140 to allow the user 104 to control presentation of the content 106 or the modified content 138.

The presentation module 142 may be configured to generate the modified content 138. The modified content 138 may comprise modified electronic book data. The text of the electronic book data may include one or more modified glyphs 144 expressed as signs, symbols, or letters. In some implementations, the modified content 138 includes other data such as audio data, video data, application data, game data, and so forth.

In the example depicted in FIG. 1, the modified content 138 includes at least one modified glyph 144. In this example, the modified glyph 144 is depicted as the letter "j". When compared with the letter "j" of the glyphs 114 of the content 106, the modified glyph 144 is depicted as being rotated and having a bold font applied.

In some implementations, the presentation module 142 may generate the modified content 138 by applying the parameter data 118 to the content 106. Continuing with the example, as discussed above the parameter data 118(1) may comprise information, which when applied to the content 106, causes each "j" glyph to be rotated and made bold. As depicted in FIG. 1, the glyph "j" depicted in the word "jam" has been rotated and made bold.

The user interface module 140 may enable the user 108 to select whether to cause the media device 104 to display the glyphs 114 of the content 106, or display the modified glyphs 144. While the modified glyph 144 is depicted as the letter "j" being rotated and made bold, the modified glyphs 144 may be modified in various other ways. For example, the application of the parameter data 118 to the content 106 may cause the glyphs 114 of the content 106 to displayed such that the outline of the glyphs 114 is changed, the spacing between the glyphs 114 is changed, the color of the glyphs 114 is changed, and so forth.

Figure 2:
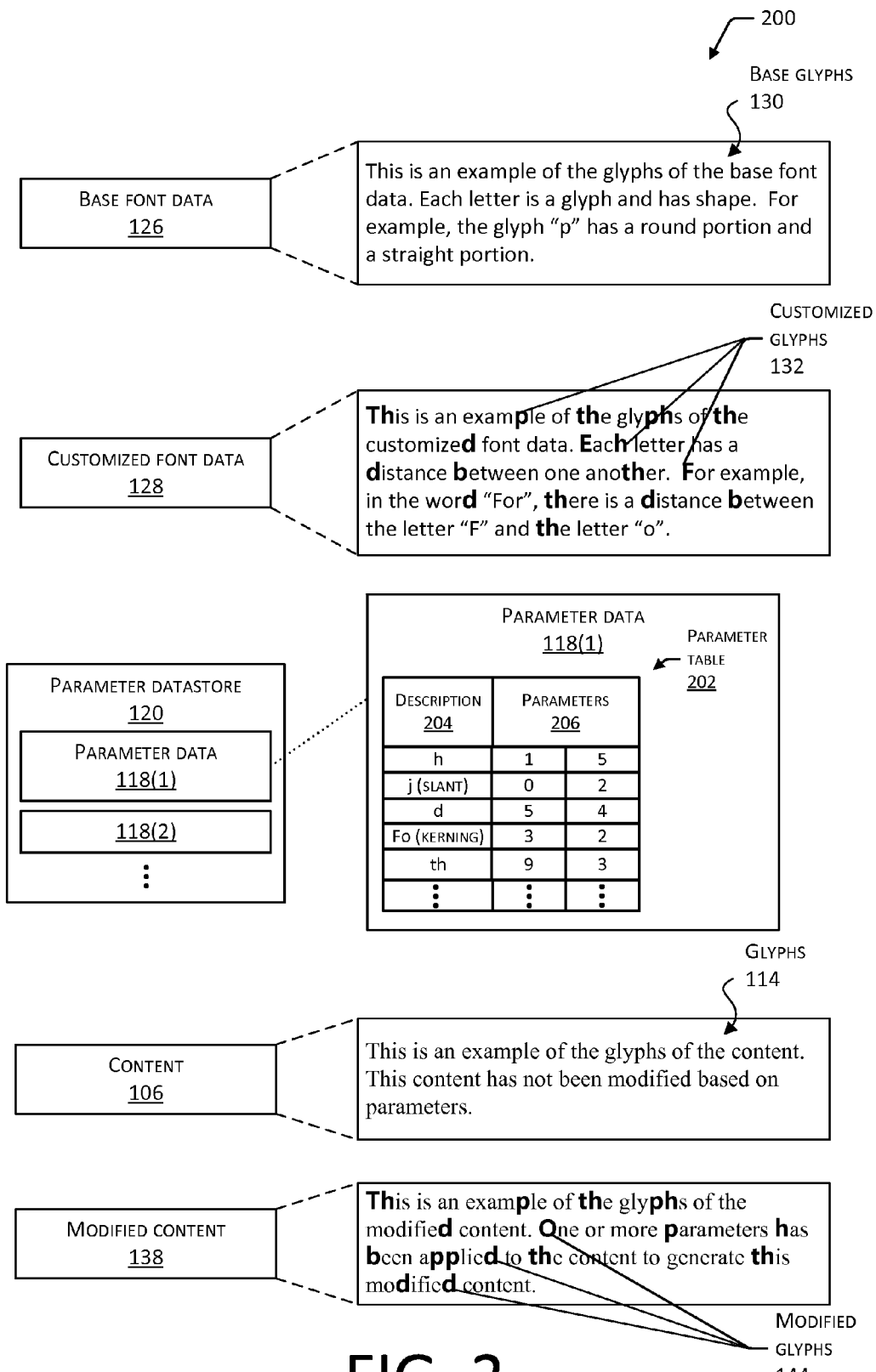
FIG. 2 illustrates examples of base font data, customized font data, parameter data, content, and modified content.

FIG. 2 illustrates examples of the base font data 126, the customized font data 128, the parameter data 118(1), the content 106, and the modified content 138. In one example, a particular base content 124 (not shown) may include the base font data 126 and the customized font data 128. The particular base content 124 may be representative of a first electronic book previously uploaded to the server 102 by a user 108 such as a publisher.

The base font data 126 includes base glyphs 130. The base glyphs 130 have a first font. The base font data 126 may include other data such as printer font information used by one or more computing devices when printing the base glyphs 130.

The customized font data 128 includes customized glyphs 132. When compared to the base glyphs 130, the customized glyphs 132 are different. For example, the letters "p", "h", "d", and "b" are more darkened and are larger when compared to the base glyphs 130. In addition, the first letter of each sentence is more darkened and larger when compared to the base glyphs 130. The customized font data 128 may include other data such as printer font information used by one or more computing devices when printing the customized glyphs 132.

The parameter data 118(1) includes a parameter table 202 that stores data that may be visualized as being organized in columns and rows. The parameter table 202 includes at least the following two field names: description 204 and parameters 206. The description 204 describes the glyphs that the parameters 206 modify. For example, the parameters of the first row (i.e., 1 and 5) may be applied to the letter "h", causing some type of modification to the letter "h". As described above, the application of the parameters 206 may cause various changes such as a change in the shape of a glyph, a change in the orientation, a change in the spacing between glyphs, and so forth. The second row of the parameter table 202 includes the description 204 "j (slant)". This description may indicate that the application of the parameters 206 "0" and "2" may modify the angle or orientation of the letter "j". The fourth row of the parameter table 202 includes the description 204 "Fo (kerning)". This description may indicate that the application of the parameters 206 "3" and "2" may modify the spacing between the glyphs 114 "F" and "o". The parameters 206 shown in the parameter table 202 may be described as values. Parameters 206 or values may be expressed as a dimensionless scaled number such as between 1 and 1000.

The parameter data 118(1) includes at least one parameter 206 used to modify a particular glyph 114 or set of glyphs 114. For example, as depicted in the first row of the parameter table 202, a first parameter 206 having a value of "1" and a second parameter 206 having a value of "5" may be used by the media device 104 to modify the glyph 114 that includes "h". The first parameter 206 may be used to extend the line portion of the "h", and the second parameter 206 may be used to increase the width or thickness of the "h". The second row of the parameter table 202 depicts a parameter 206 having a value of "0" and a parameter 206 having a value of "2". The media device 104 may apply these parameters 206 to the glyph 114 that includes the letter "j" for modification.

The content 106 includes glyphs 114. The content 106 may include other data such as video data, audio data, or printer font information used by one or more computing devices when printing the glyphs 114. The modified content 138 includes modified glyphs 144. When compared to the glyphs 114, the modified glyphs 144 are different. For example, the letters "p", "h", "d", and "b" are more darkened and are larger when compared to the base glyphs 130. In addition, the first letter of each sentence is more darkened and larger when compared to the base glyphs 130. The modified content 138 may include other data such as printer font information used by one or more computing devices when printing the modified glyphs 144.

The presentation module 142 may apply the parameters 206 to the glyphs 114 to generate the modified glyphs 144. While in this example parameters 206 from the parameter data 118(1) are applied to the glyphs 114 of the content 106, in other implementations, more than one parameter data (e.g., parameter data 118(1), 116(2), 116(20)) may be applied to the glyphs 114 to generate the modified glyphs 144.

Figure 3:
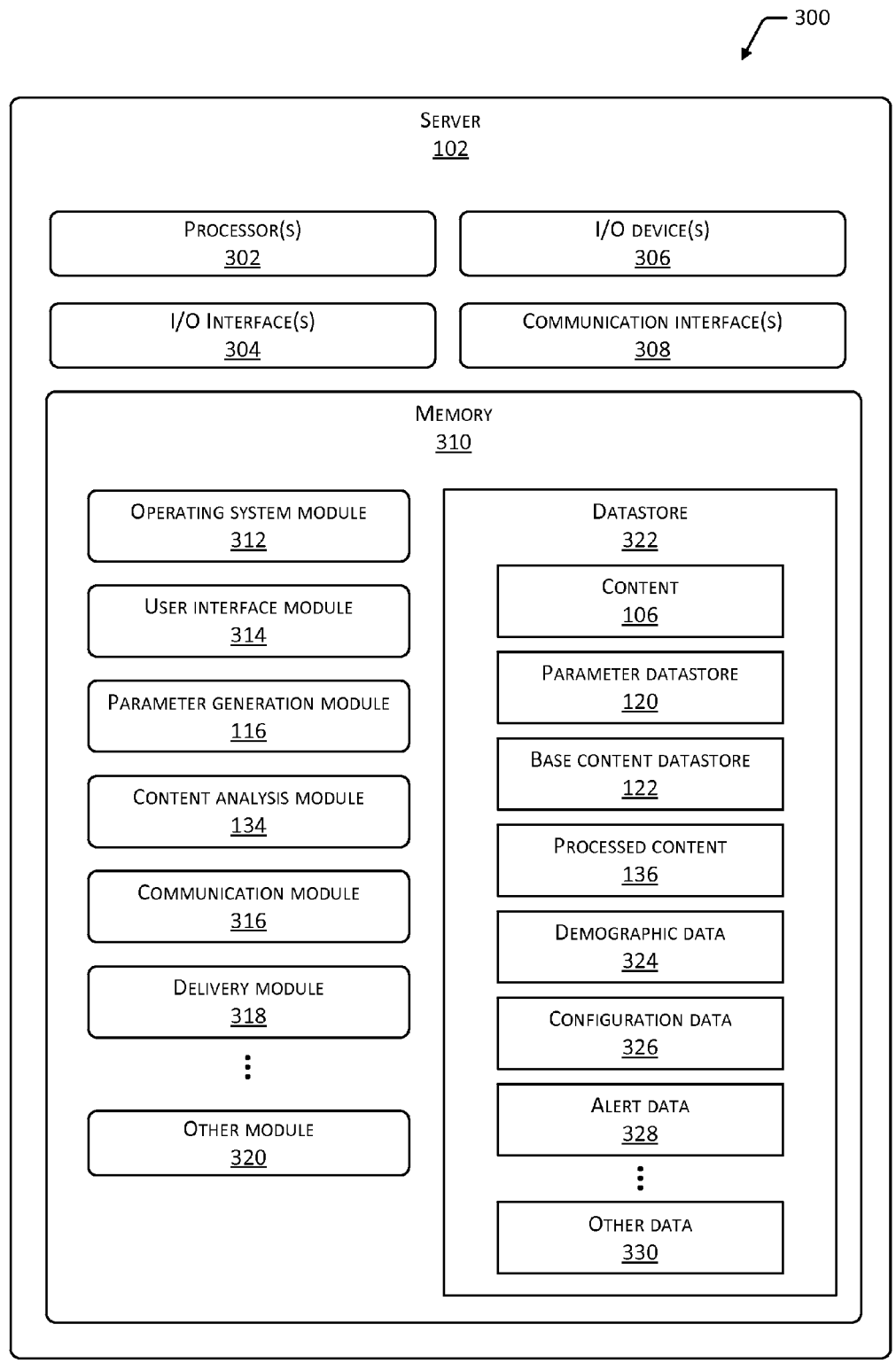
FIG. 3 is a block diagram of the server configured to generate processed content that may be used by the media device to modify content.

FIG. 3 is a block diagram 300 of the server 102. As described above the server 102 may generate processed content 136 that may be used by the media device 104 to modify content 106. The functions associated with the server 102 described in this disclosure may be implemented by one or more servers 102, and by one or more entities. For example, in one implementation, one server 102 may provide and distribute the processed content 136 while another generates the parameter data 118. The one or more servers 102 may be physical server devices or virtual servers executing on physical server devices.

The server 102 may include at least one hardware processor 302 (or "processor") configured to execute stored instructions. The at least one hardware processor 302 may comprise one or more cores.

The server 102 includes at least one I/O interface 304 which enables portions of the server 102 (e.g., the hardware processor 302) to communicate with other devices. The I/O interface 304 may be configured to implement various protocols, such as inter-integrated circuit ("I2C"), serial peripheral interface bus ("SPI"), Universal Serial Bus ("USB"), RS-232, HDMI, TOSLINK, Bluetooth®, and so forth. The at least one I/O interface 304 may be operatively connected to at least one I/O device 306. In some implementations, certain I/O devices 306 are physically incorporated with the server 102 or externally placed.

The at least one I/O interface 304 may be operatively connected to one or more I/O devices 306. The I/O devices 306 may include input devices such as one or more of a keyboard, a touch sensor, and so forth. The I/O devices 306 may also include output devices such as one or more of a display, printer, and so forth. In some embodiments, the I/O devices 306 may be physically incorporated with the server 102 or may be externally placed and communicatively coupled thereto.

The server 102 may include at least one communication interface 308. The communication interface 308 may be configured to provide communications between the server 102 and other devices such as the media device 104, routers, access points, other servers 102, and so forth. The communication interface 308 may include an Ethernet interface which connects to the network 110.

The server 102 may also include one or more busses or other internal communications hardware or software that allow for the transfer of data between the various modules and components of the server 102.

As illustrated in FIG. 3, the server 102 may include at least one memory or memory device 310. The memory 310 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the server 102.

The memory 310 may include at least one operating system ("OS") module 312. The OS module 312 may be configured to manage hardware resources such as the I/O interface 304, the I/O devices 306, the communication interface 308, and provide various services to applications or modules executing on the hardware processor 302. The memory 310 may also store at least one of the following modules which may be executed as foreground applications, background tasks, daemons, and so forth.

The memory 310 may include a user interface module 314 configured to provide a user interface to the user 108 or to the media device 104. In one implementation, the user interface may be a web interface presented via the network and accessible to the users 108. In another implementation the user interface may comprise an application programming interface ("API") which enables communication such as sending requests for content 106 from the media device 104 to the server 108.

As described above, the parameter generation module 116 may be configured to generate the parameter data 118. The parameter generation module 116 may generate the parameter data 118 based on an analysis of base content 124. The parameter data 118(1) may be generated based on a comparison of multiple sets of base content 124. For example, a first base content 124(1) may include first base font data 126(1) and first customized font data 128(1), and a second base content 124(2) may include second base font data 126(2) and second customized font data 128(2). The parameter generation module 116 may determine first differences between the first base font data 126(1) and the first customized font data 128(1), and second differences between the second base font data 126(2) and the second customized font data 128(2). The differences may include various differences such as differences in outlines between the glyphs, differences in color between the glyphs, differences in spacing between the glyphs, and so forth. Based on the first differences and the second differences, the parameter generation module 116 may generate parameter data 118 that, when applied to the glyphs 114 of the content 106, may cause the same or similar changes to the glyphs 114 of the content 106.

As described above, the content analysis module 134 may generate the processed content 136. The generation of the processed content 136 may include combining the content 106 with one or more selections of the parameter data 118(1), 116(2), . . . 116(P). The selection of the parameter data 118 may be based on a comparison of the content 106 with the base content 124(1), 122(2), . . . 122(B). In one example, the content analysis module 134 selects the parameter data 118(1) in response to a determination that the glyphs 114 of the content 106 match or substantially match a set of base glyphs 130 of a particular base content 124. For example, the outline of a glyph 114 may match the outline of a base glyph 130. Once a match has been determined, the content analysis module 134 may query the parameter datastore 120 for the parameter data 118 that is associated with or has been generated based on the base font data 126 that has been determined to match or substantially match.

The server 102 may include a communication module 316 configured to establish and support communications with the media device 104 or other devices. For example, the communication module 316 may execute instructions which support transmission of data across a data network using the transmission control protocol/internet protocol ("TCP/IP").

A delivery module 318 may be configured to provide the processed content 136 to one or more of the media devices 104. Providing the processed content 136 may be initiated by a request from the media device 104, by the server 102, or by another device. In some implementations, the delivery module 318 is configured to provide the content 106 and the parameter data 118 separately.

The memory 310 may include other modules 320. For example, an authentication module may be configured to authorize delivery of the content 106 to a particular media device 104.

In some implementations, the memory 310 includes a datastore 322 for storing information. The datastore 322 may use a flat file, database, linked list, tree, or other data structure to store the information. In some implementations, the datastore 322, or a portion thereof, may be distributed across at least one other device, such as a server, a network storage device, and so forth. As illustrated in FIG. 3, the datastore 322 may include at least one of the content 106, the parameter datastore 120, the base content datastore 122, the processed content 136, demographic data 324, configuration data 326, or alert data 328. The datastore 322 may include the other data 330 which may include information such as administrator preferences, account information associated with the user 108, and so forth.

The demographic data 324 may include data which may indicate at least one of: the age of the user 108; the address of the user 108; the gender of the user 108; the ethnicity of the user 108; the nationality of the user 108; or the knowledge of languages of the user 108. In some implementations, the content analysis module 134 uses the demographic data 324 as an input to select one or more parameter data 118. For example, first parameter data 118 may have been generated for children. If the user 108 is a child, the content analysis module 134 may select the first parameter data 118, and provide the first parameter data 118 to the media device 104.

The configuration data 326 may comprise information about a user selection. For example, the user 108 may operate with the user interface module 140 and enter a request for one or more glyphs 114 to be modified or to not be modified. The parameter data 118 that is applied to the content 106 may cause the first letter of each sentence to be displayed in bold. However, the user 108 may dislike this application, and send a request to the server 102 indicating that the user 108 prefers for this application to end. The server 102 may then provide different parameter data 118 to the media device 104 resulting in the termination of the application of parameters 206 for purposes of bolding the first letter of each sentence.

The alert data 328 may comprise information about the application of the parameter data 118 to the glyphs 114. For example, the alert data 328 may indicate that the application of the parameter data 118 to one or more glyphs 114 results in an increase in surface area of the glyphs 114 at or above a threshold level. The alert data 328 is discussed in more detail below with regard to FIG. 4.

Figure 4:
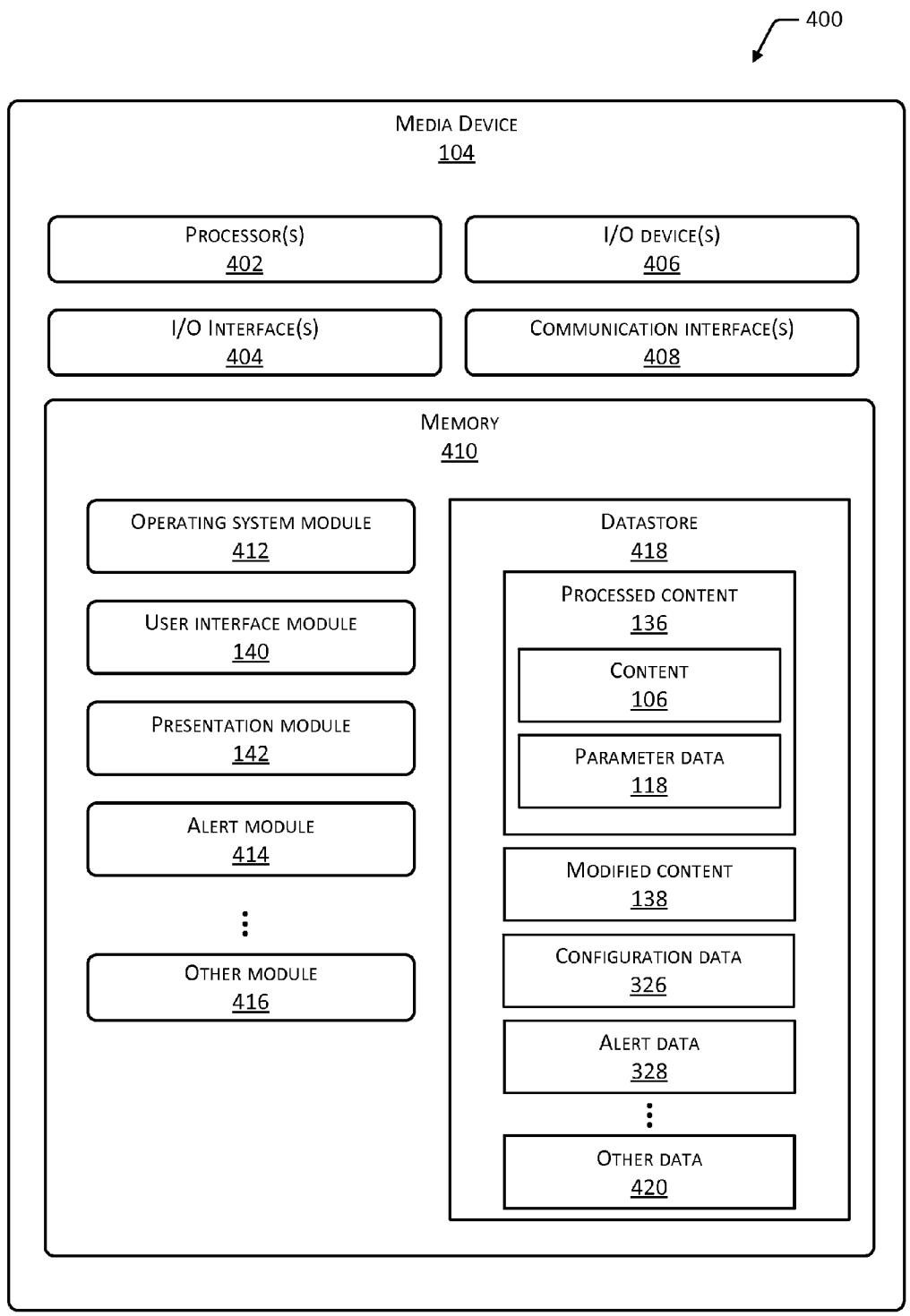
FIG. 4 illustrates a block diagram of the media device configured to modify the content by applying one or more parameters to the content.

FIG. 4 illustrates a block diagram 400 of the media device 104. As described above, the media device 104 may be configured to modify the content 106 by applying one or more parameters 206 to the content 106. The media device 104 may be referred to as a user device. The media device 104 may include one or more hardware processors 402 (or "processors") configured to execute stored instructions. The processors 402 may comprise one or more cores.

The media device 104 includes at least one I/O interface 404 which enables portions of the media device 104 (e.g., the hardware processor 402) to communicate with other devices. The I/O interface 404 may be configured to implement various protocols, such as I2C, SPI, USB, RS-232, HDMI, TOSLINK, Bluetooth®, and so forth. The at least one I/O interface 404 may be operatively connected to one or more I/O devices 406. The I/O devices 406 may include input devices such as one or more of a keyboard, a touch sensor, and so forth. The I/O devices 406 may also include output devices such as one or more of a display, printer, and so forth. In some embodiments, the I/O devices 406 may be physically incorporated with the media device 104 or may be externally placed and communicatively coupled thereto.

The media device 104 may also include at least one communication interface 408. The at least one communication interface 408 may be configured to provide communications between the media device 104 and other devices such as the server 102, routers, access points, other servers, and so forth. The communication interfaces 408 may include personal area networks, wireless local area networks, wireless wide area networks, and so forth. The media device 104 may communicate with the remote control using one or more of the communication interfaces 408. For example, the media device 104 may communicate with the remote control using a Bluetooth® personal area network.

The media device 104 may also include one or more busses, other internal communications hardware, or software that allow for the transfer of data between the various modules and components of the media device 104.

As illustrated in FIG. 4, the media device 104 may include at least one memory or memory device 410. The memory 410 may include at least one non-transitory CRSM. The CRSM may include at least one of an electronic storage medium, a magnetic storage medium, an optical storage medium, a quantum storage medium, or a mechanical computer storage medium. The memory 410 may include computer readable instructions, data structures, program modules, and other data for the operation of the media device 104.

The memory 410 may include at least one OS module 412. The OS module 412 is configured to manage hardware resource devices such as the I/O interfaces 404, the I/O devices 406, the communication interfaces 408, the device interfaces, and provide various services to applications or modules executing on the hardware processor 402. The memory 410 may also store at least one of the following modules which may be executed as foreground applications, background tasks, daemons, and so forth.

The memory 410 may include the user interface module 140 configured to provide the user interface to the user 108 using the I/O devices 406 and accept inputs received from the user input I/O devices 406. The user interface may include one or more visual, audible, or haptic elements.

As discussed above, the memory 410 may include the presentation module 142. The presentation module 142 may be configured to present the content 106 or the modified content 138 on, or in conjunction with, a display device of the media device 104. The presentation module 142 may be configured to generate the modified content 138. The presentation module 142 may generate the modified content 138 by applying the parameter data 118 to the content 106. As described above, the application of the parameter data 118 to the content 106 may cause various modifications to the display of the content 106. For example, the modifications may include at least one of: changes in the outline of a glyph 114; changes in the spacing between glyphs 114; changes in the color of the glyphs 114, and so forth.

The memory 410 may include an alert module 414 configured to generate the alert data 328. As discussed above with regard to FIG. 3, the alert data 328 may comprise information about the application of the parameter data 118 to the glyphs 114. In one example, the alert data 328 indicates that the application of the parameter data 118 to one or more glyphs 114 results in an increase in surface area of the glyphs 114 at or above a threshold level. In another example, the alert data 328 indicates that the distance between two glyphs 114 has increased at or above a threshold amount.

The memory 410 may include other modules 416. For example, a digital rights management module may work in conjunction with the presentation module 142 to facilitate access to content 106.

The memory 410 may also include a datastore 418 to store information. The datastore 418 may use a flat file, database, linked list, tree, or other data structure to store the information. In some implementations, the datastore 418 or a portion of the datastore 418 may be distributed across one or more other devices including servers, network attached storage devices, and so forth.

The datastore 418 may store one or more of the processed content 136, the modified content 138, or the alert data 328. As depicted in FIG. 4, the processed content 136 includes content 106 and parameter data 118. The parameter data 118 may comprise one or more of the parameter data 118(1), 116(2), . . . 116(P) shown in FIG. 1. Other data 420 may also be stored, such as user preferences, account login information, and so forth.

Figure 5:
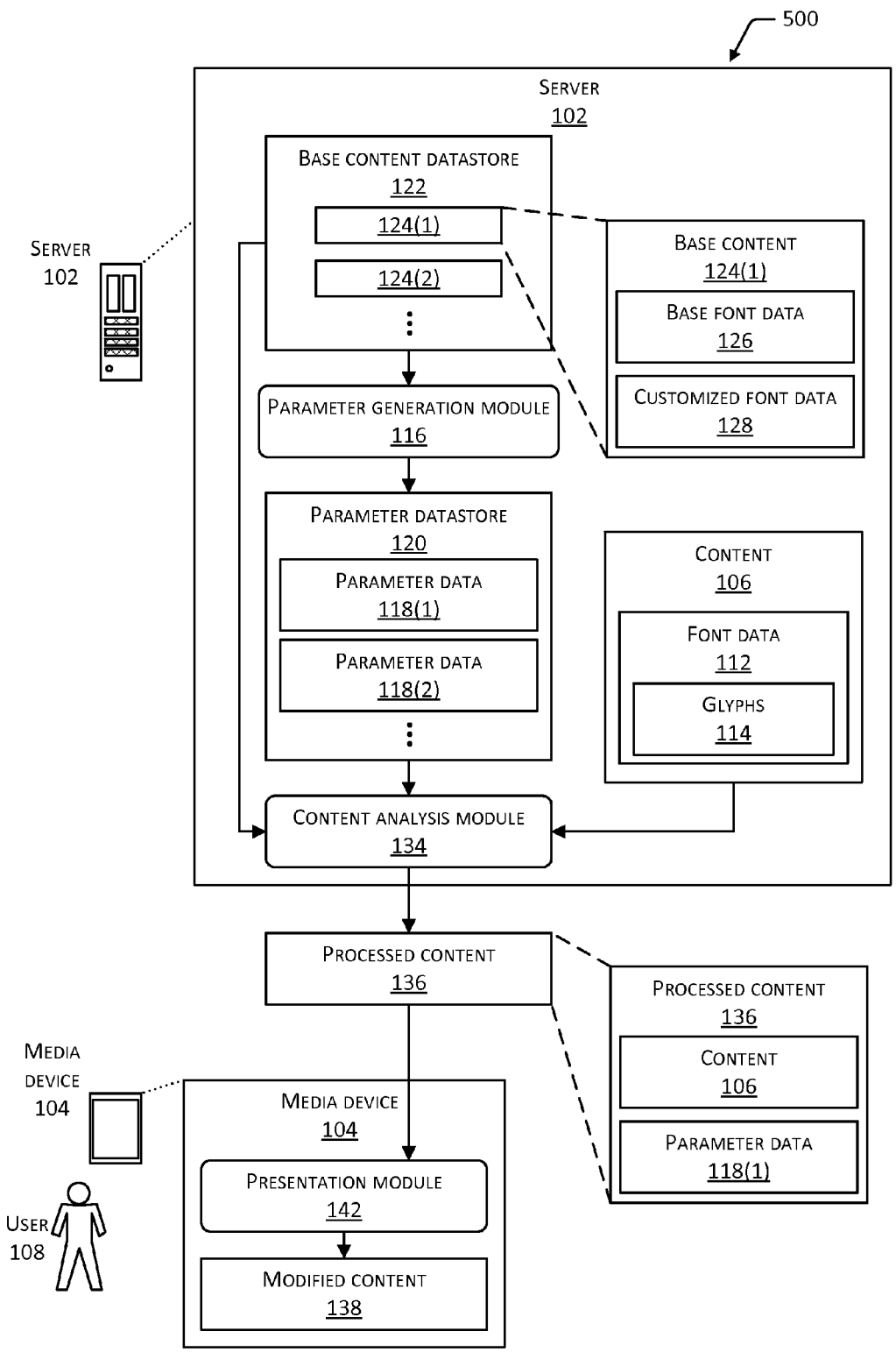
FIG. 5 is an illustration of the presentation module generating the modified content using the processed content as an input.

FIG. 5 is an illustration 500 of the presentation module 142 generating the modified content 138 using the processed content 136 as an input. The server 102 may provide the processed content 136 to the media device 104 using the network 110 described above. In some implementations, the parameter data 118 is provided separate from the content 106.

In this example, the parameter generation module 116 generates the parameter data 118(1), 116(2), . . . , 116(P) using the base content 124(1), 122(2), . . . , 122(B) as inputs. As discussed above with regard to FIG. 1, the parameter generation module 116 may generate the parameter data 118 by comparing the base font data 126 with the customized font data 128. In some implementations, the parameter generation module 116 generates the parameter data 118(1), 116(2), . . . , 116(P) using the content 106 as an input. For example, the parameter generation module 116 may compare the glyphs 114 with one another and determine that one or more glyphs 114 are too similar to one or more other glyphs 114. The parameter generation module 116 may compare the glyphs 114 by overlaying a first glyph 114 on a second glyph 114. For example, when the letter "n" is overlaid on the letter "h", the parameter generation module 116 may determine that the difference between the letter "n" and the letter "h" is at or below a threshold.

As described above with regard to FIG. 1, the content analysis module 134 may select certain parameter data 118 from the parameter datastore 120 based on a comparison of at least a portion of the glyphs 114 of the content 106 with the base glyphs 130 of the base content 124. The comparison may result in a determination that one or more of the glyphs 114 of the content 106 are the same or substantially similar to one another. In response to this determination, the content analysis module 134 may select the parameter data 118 that is associated with or is generated based on the base content 124. One or more parameter data 118 may be associated with or generated based on a given base content 124. The content analysis module 134 may generate the processed content 136 which may comprise the content 106 and the selected parameter data 118.

In FIG. 5, the server 102 provides the processed content 136 to the media device 104. In some implementations, the server 102 provides the content 106 and the selected parameter 116 to the media device 104 separately.

The presentation module 142 generates the modified content 138 using the processed content as an input. The presentation module 142 may generate the modified content 138 in response to a request from the user 108.

Figure 6:
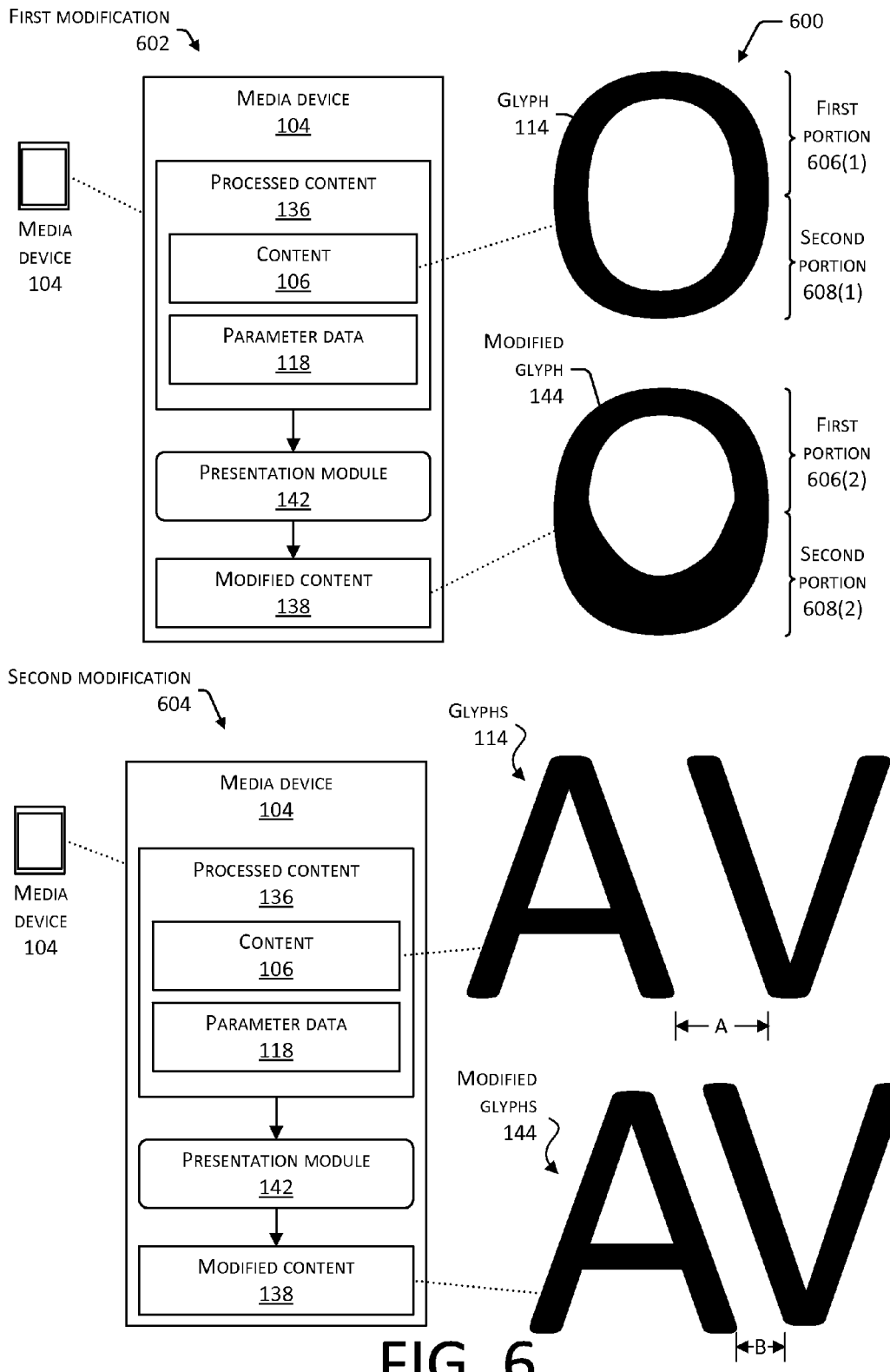
FIG. 6 illustrates examples of applying the parameter data to generate modified glyphs.

FIG. 6 illustrates examples of applying the parameter data 118 to generate modified glyphs 144. A first modification 602 and a second modification 604 are depicted.

Under the first modification 602, the presentation module 142 accesses the processed content 136. The processed content 136 includes the content 106 and the parameter data 118. The parameter data 118 may comprise at least one of parameter data 118(1), 116(2), . . . 116(P). The content 106 includes the glyph 114 (depicted as the letter "O") having more than one portion. The glyph 114 has a first portion 606(1) and a second portion 608(2). The portions may be visualized as a top half of the glyph 114, and a bottom half of the glyph 114.

The presentation module 142 may apply the parameter data 118 such that one or more portions of the glyph 114 are modified. For example, the modified glyph 144 depicted in FIG. 6 has a modified second portion 608(2), while the first portion 606(2) remains unmodified when compared to the first portion 606(1) of the glyph 114. In this example, the application of the parameter data 118 to the glyph 114 causes an increase in the width of the bottom portion of the glyphs 114 of the content 106.

Under the second modification 604, the presentation module 142 accesses the processed content 136 which includes the content 106 and the parameter data 118. In this example, the content 106 includes the glyph 114 which are depicted as the letters "AV". The presentation module 142 generates the modified content 138 by applying the parameter data 118 to the content 106. The modified content 138 includes the modified glyphs 144. In this example, the application of the parameter data 118 to the content 106 causes one or more spaces between one or more glyphs 114 to be decreased. For the glyphs 114 of the content 106, the distance between the letters "A" and "V" is depicted as distance A. For the modified glyphs 144 of the modified content 138, the distance between the letters "A" and "V" is depicted as distance B. By decreasing the distance between certain letters, readability may be improved for some users 108.

Figure 7:
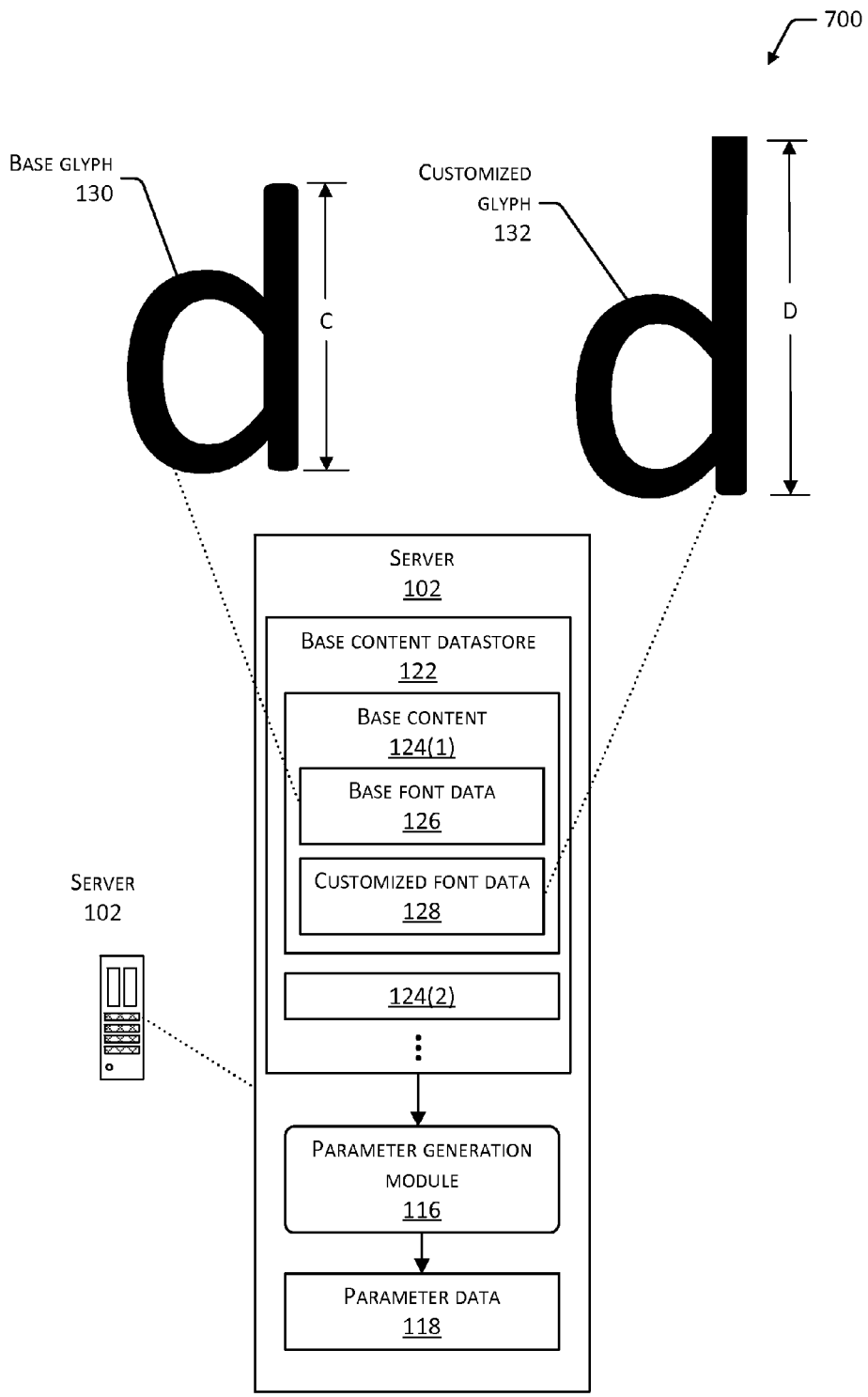
FIG. 7 illustrates an example of the parameter generation module generating the parameter data based on a comparison of the base font data and the customized font data.

FIG. 7 illustrates an example of the parameter generation module 116 generating the parameter data 118 based on a comparison of the base font data 126 and the customized font data 128.

The parameter generation module 116 accesses the base content datastore 122. In this example, the parameter generation module 116 compares the base glyph 130 with the customized glyph 132 of the base content 124(1). In other examples, to generate the parameter data 118, the parameter generation module 116 may analyze or compare base glyphs 130 with customized glyphs 132 of more than one base content 124 such as based content 122(2), 122(3), and so forth.

In this example, the base glyph 130 is illustrated as the letter "d" having a line portion with a length C. The customized glyph 132 is illustrated as the letter "d" having a line portion with a length D. As depicted, the length D is greater the than the length C. This increase in length may be the result in a design feature conducted by a font designer. The parameter generation module 116 may determine the difference between the lengths of length C and length D. The difference may be represented as a value or a number. The parameter data 118 may comprise information that, when applied to the glyphs 114 of the content 106, may increase the length of a portion of the glyphs 114 by the value that represents the difference determined by the parameter generation module 116.

Figure 8:
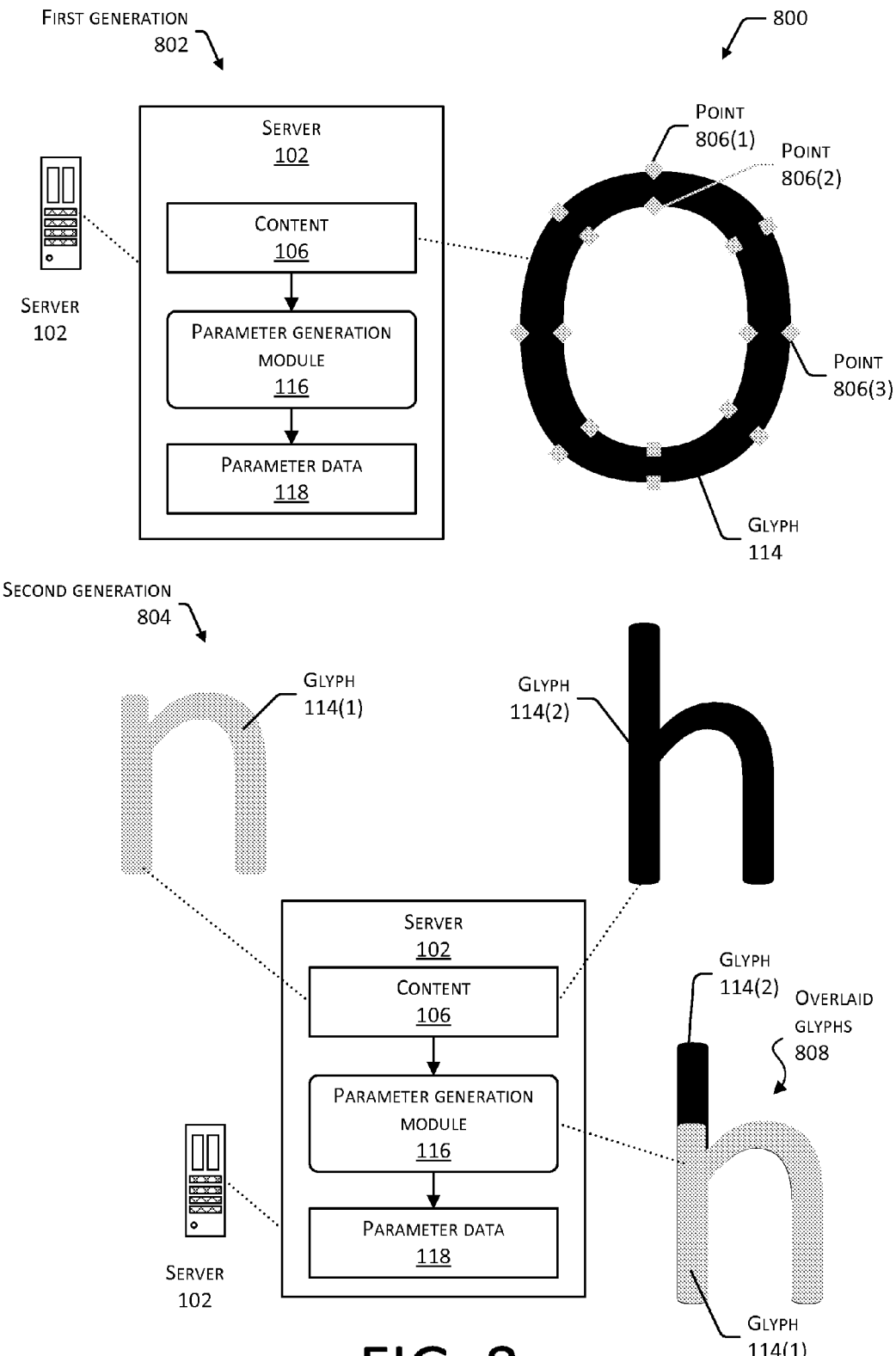
FIG. 8 illustrates examples of the parameter generation module generating parameter data using the content as an input.

FIG. 8 illustrates examples of the parameter generation module 116 generating parameter data 118 using the content 106 as an input. A first generation 802 and a second generation 804 are depicted.

Under the first generation 802, the parameter generation module 116 accesses the content 106. In this example, the content 106 includes the glyph 114 depicted as the letter "O". The glyph 114 includes a plurality of points 806. The plurality of points 806 may be used by the media device 104 to display content 106. In some implementations, the font of the content 106 may comprise a vector font which uses the points 806 such that the glyphs 114 of the content 106 are scalable when compared to other types of font such as bitmap font.

The plurality of points 806 are positioned at distances from one another. The parameter generation module 116 may generate parameter data 118 in response to a determination that certain points 806 are positioned at certain distances from one another. For example, the parameter generation module 116 may generate parameter data 118 in response to a determination that the distance between point 806(1) and 806(2) is less than or equal to a threshold distance. The parameter data 118 may comprise information that, when applied by the media device 104, causes the distance between certain points 806 to increase or decrease. When the distance between points 806 are increased or decreased, the shape of the glyph 114 may be modified. Such a modification may result in increased readability for some users 108.

Under the second generation 804, the parameter generation module 116 accesses content 106 which include glyphs 114 (1) and 114(2). The glyph 114(1) comprises the letter "n", and the glyph 114(2) comprises the letter "h". In this example, the parameter generation module 116 analyzes the glyphs 114(1) and 114(2) by overlaying the glyph 114(1) on the glyph 114(2). By overlaying the glyph 114(1) on the glyph 114(2), the parameter generation module 116 may determine when the glyphs 114(1) and 114(2) may be too similar. Similar glyphs 114 may decrease readability for some users 108. In some implementations, the parameter generation module 116 determines that a first glyph 114 is too similar to another glyph 114 in response to a determination that a threshold amount of surface area of the first glyph 114 overlays the surface area of the second glyph 114 and exceeds the threshold amount. In FIG. 8, overlaid glyphs 808 are depicted. The overlaid glyphs 808 comprise the glyph 114(1) overlaid on the glyph 114(2). As shown, all of the surface area of the glyph 114(1) overlays the surface area of the glyph 114(2). As a result, the parameter generation module 116 may generate parameter data 118 which, when applied to at least one of the glyph 114(1) or the glyph 114(2), changes the shape of the glyph 114(1) or 114(2) such that a threshold amount of the surface area of the glyphs 114 does not overlap the surface area of the second glyph 114(2).

Figure 9:
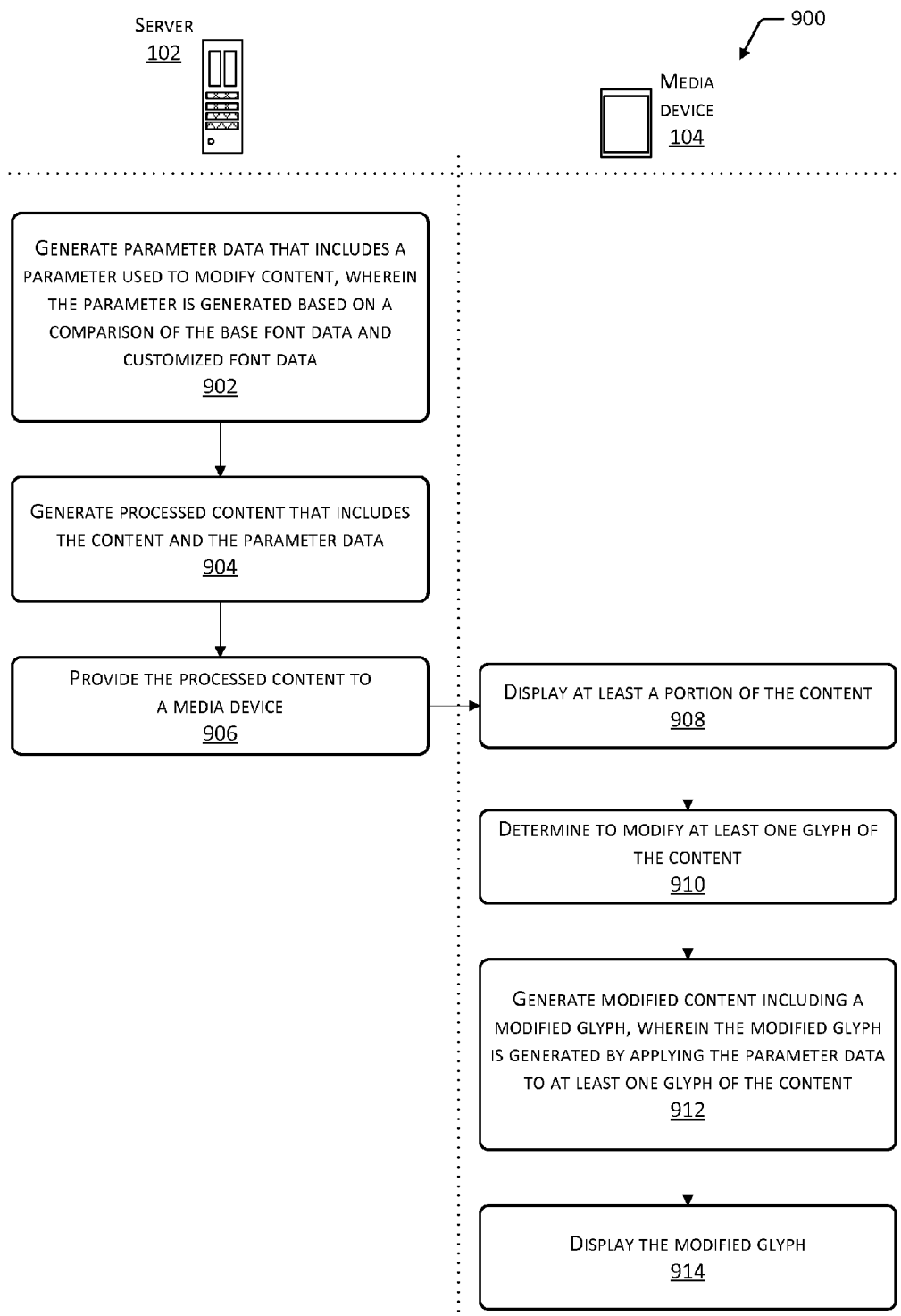
FIG. 9 is a flow diagram illustrating a process of providing processed content to a media device configured to use the parameter data to modify the content.

FIG. 9 is a flow diagram 900 illustrating a process of providing processed content 136 to the media device 104 configured to use the parameter data 118 to modify the content 106. Although the process 900 is described with reference to the flowchart illustrated in FIG. 9, many other methods performing the acts associated with the process 900 may be used. For example, the order of the steps may be changed, some of the steps described may be optional, and additional steps may be included.

At block 902, the server 102 generates parameter data 118 that includes a parameter 206 used to modify content 106. In this example, the parameter 206 is generated based on a comparison of the base font data 126 and the customized font data 128. In other examples, the parameter 206 may be generated based on an analysis of the content 106 such as the examples depicted with regard to FIG. 8.

At block 904, the server 102 generates processed content 136 that includes the content 106 and the parameter data 118. The generation of the processed content 136 may include selecting one or more parameter data 118 from the parameter datastore 120. The selection may be based on a comparison of the glyphs 114 of the content 106 with the base glyphs 130 stored in the base content datastore 122. For example, the server 102 may determine that the glyphs 114 match or substantially match the base glyphs 130 of first base content 124. Thereafter, the server 102 may select parameter data 118 that is associated with the first base content 124. The parameter data 118 that is associated with the first base content 124 may include at least one of parameter data 118(1), 116(2), or 116(P).

At block 906, the server 102 provides the processed content 136 to the media device 104. In some implementations, the server 102 provides the content 106 separate from the parameter data 118 of the processed content 136.

At block 908, the media device 104 displays at least a portion of the content 106. At block 910, the media device 104 determines to modify at least one glyph 114 of the content 106. The media device 104 may determine to modify the at least one glyph 114 of the content 106 in response to receiving input data representing a request from the user 108 to modify the content 106. In some implementations, the content 106 is not displayed, but instead the modified glyphs 144 are displayed. In these implementations, the user 108 is not given the option to change the display of the content 106, and instead the media device 104 automatically makes the changes.

At block 912, the media device 104 generates modified content 138 that includes at least one modified glyph 144. The generation of the modified glyph 144 may include applying the parameter data 118 to the at least one glyph 114 of the content 106. At block 914, the media device 104 displays the at least one modified glyph 144.

Figure 10:
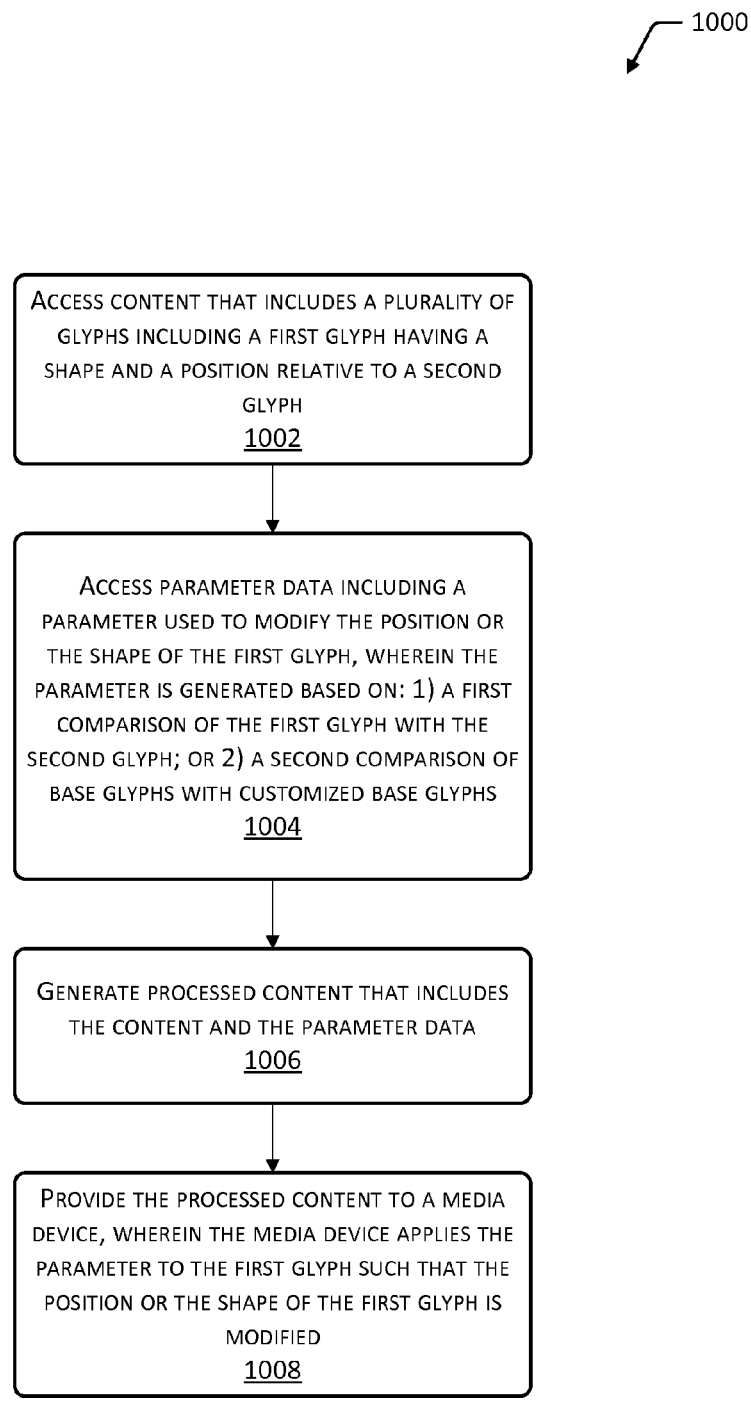
FIG. 10 is a flow diagram illustrating a process of generating processed content that includes parameter data generated based on a comparison of glyphs.

FIG. 10 is a flow diagram 1000 illustrating a process of generating processed content 136 that includes parameter data 118 generated based on a comparison of glyphs. Although the process 1000 is described with reference to the flowchart illustrated in FIG. 10, many other methods performing the acts associated with the process 1000 may be used. For example, the order of the steps may be changed, some of the steps described may be optional, and additional steps may be included.

At block 1002, the server 102 accesses content 106 that includes a plurality of glyphs 114 including a first glyph 114(1) having a shape and a position relative to a second glyph 114(2). In one example, the content 106 includes an electronic book having many words including the word "widget", the first glyph 114(1) may comprise the letter "w", and the second glyph 114(2) may comprise the letter "i". The letter "w" has a shape that includes four lines having a designated width. The letter "w" is also positioned at a distance from the letter "i".

At block 1004, the server 102 accesses parameter data 118 including a parameter 206 used to modify the position or the shape of the first glyph 114(1). The parameter 206 is generated based on a comparison of other glyphs. The other glyphs may comprise base glyphs 130 and customized glyphs 132. In one example, the server 102 accesses the parameter datastore 120 that is configured to store a plurality of parameter data 118 including the parameter data 118(1), 116(2), . . . 116(P).

At block 1006, the server 102 generates processed content 136 that includes the content 106 and the parameter data 118. The generation of the processed content 136 may include selecting one or more parameter data 118 from the parameter datastore 120. The selection may be based on a comparison of the glyphs 114 of the content 106 with the base glyphs 130 stored in the base content datastore 122. For example, the server 102 may determine that the glyphs 114 match or substantially match the base glyphs 130 of first base content 124. Thereafter, the server 102 may select parameter data 118 that is associated with the first base content 124. The parameter data 118 that is associated with the first base content 124 may include at least one of parameter data 118(1), 116(2), or 116(P).

At block 1008, the server 102 provides the processed content 136 to the media device 104. The media device 104 applies the parameter 206 to the first glyph 114(1) such that the position or the shape of the first glyph 114(1) is modified.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
a communication interface;
a memory storing computer-executable instructions; and
a processor communicatively coupled to the communication interface and the memory, the processor configured to execute the computer-executable instructions to:
access content that includes a first plurality of glyphs including a first glyph and a second glyph, wherein the first glyph has a shape and the first glyph has a position relative to the second glyph;
access base font data that includes a second plurality of glyphs including a third glyph;
access customized font data that includes a third plurality of glyphs including a fourth glyph;
generate parameter data comprising a first parameter used to modify the shape of the first glyph, wherein the first parameter is generated based on a comparison of the third glyph and the fourth glyph; and provide the content and the parameter data to a media device configured to apply the first parameter to the first glyph.

2. The system of claim 1, wherein:
the first glyph includes a line having:
a first portion having a first width;
a second portion having a second width; and
the first parameter is used to modify the shape of the first glyph by increasing the first width.

3. The system of claim 1, wherein the parameter data includes a parameter table that includes the first parameter and a second parameter used to modify the shape of the first glyph.

4. The system of claim 1, wherein the parameter data includes a parameter table that includes the first parameter and a second parameter used to modify the position of the first glyph relative to the second glyph.

5. A method comprising:
accessing first content that includes a first plurality of glyphs including a first glyph and a second glyph, wherein the first glyph has a shape and the first glyph has a position relative to the second glyph;
accessing first parameter data comprising a first parameter for modifying at least one of the position or the shape of the first glyph, wherein the first parameter is generated based on at least one of:
a first comparison of the first glyph and the second glyph; or
a second comparison of base font data and customized font data, wherein:
the base font data comprises a second plurality of glyphs; and
the customized font data comprises a third plurality of glyphs; and
providing the first content and the first parameter data to a user device configured to apply the first parameter to the first glyph such that at least one of the position or the shape of the first glyph is modified.

6. The method of claim 5, wherein:
accessing the first parameter data includes accessing a parameter datastore;
the parameter datastore is configured to store the first parameter data and second parameter data; and
wherein the first parameter data is selected based on a comparison of the first plurality of glyphs with the second plurality of glyphs.

7. The method of claim 5, wherein:
the second plurality of glyphs includes a third glyph having a first portion having a first length;
the third plurality of glyphs includes a fourth glyph having a second portion having a second length;
a third comparison of the third glyph with the fourth glyph that includes determining a value indicating an amount representing a difference between the first length and the second length; and
further wherein the first parameter is determined based on the value.

8. The method of claim 5, wherein the application of the first parameter to the first glyph causes a distance between the first glyph and the second glyph to increase or decrease.

9. The method of claim 5, wherein:
the first parameter data comprises a table including:
the first parameter; and
a second parameter used to modify at least one of the position or the shape of the first glyph; and the user device is configured to apply the second parameter to the first glyph such that at least one of the position or the shape of the first glyph is modified.

10. The method of claim 5, further comprising accessing configuration data indicating a request for a modification of a fourth glyph, wherein:
the first content includes the fourth glyph;
the configuration data is provided by the user device;
the first parameter data comprises the first parameter and a second parameter used to modify at least one of a position or a shape of the fourth glyph; and
the user device is configured to apply the second parameter to modify at least one of the position or the shape of the fourth glyph.

11. The method of claim 5, further comprising accessing demographic data comprising information about at least one of:
an age of a user of the user device; or
a location of the user device; and
wherein the first parameter is selected based on the demographic data.

12. The method of claim 5, further comprising:
accessing second content that includes a fourth plurality of glyphs;
generating second parameter data comprising a second parameter, wherein the second parameter is generated based on a comparison of the fourth plurality of glyphs with the second plurality of glyphs of the base font data, wherein:
the user device is configured to apply the second parameter to at least a portion of the second content such that the second content is modified; and
the second parameter data is different from the first parameter data.

13. The method of claim 5, wherein the user device is configured to apply the first parameter to the first glyph in response to receiving input data indicating a request to modify the first glyph.

14. The method of claim 5, wherein:
the first glyph includes a plurality of points including a first point and a second point, wherein the first point is positioned at a distance from the second point; and
the first parameter data is generated in response to a determination that the distance is less than or equal to a threshold value.

15. The method of claim 5, wherein:
the shape of the first glyph comprises a first shape having a first surface area;
the second glyph has a second shape having a second surface area; and
the first parameter data is generated in response to a determination that, when the first glyph is overlaid on the second glyph, a threshold amount of the first surface area overlays the second surface area.

16. A user device comprising:
a communication interface;
a memory storing computer-executable instructions; and
a processor communicatively coupled to the communication interface and the memory, the processor configured to execute the computer-executable instructions to:
access content data and parameter data, wherein:
the content data includes a first plurality of glyphs including a first glyph and a second glyph, wherein the first glyph has a shape and the first glyph has a position relative to the second glyph;

the parameter data is generated based on a comparison of base font data and customized font data, wherein:
 the base font data is representative of a second plurality of glyphs; and
 the customized font data is representative of a third plurality of glyphs;
generate modified glyph data by applying the parameter data to the first glyph; and
display the modified glyph data.

17. The user device of claim 16, wherein the processor is further configured to execute the computer-executable instructions to receive input data indicating a request to generate the modified glyph data.

18. The user device of claim 16, wherein the parameter data includes a parameter table that includes a first parameter used to modify the first glyph and a second parameter used to modify the first glyph; and
 the modified glyph data is generated by applying the first parameter and the second parameter to the first glyph.

19. The user device of claim 16, wherein:
the parameter data includes a parameter table that includes a first parameter used to modify the first glyph to generate a first modified glyph and a second parameter used to modify the second glyph to generate a second modified glyph;
the modified glyph data comprises the first modified glyph and the second modified glyph;
the first modified glyph is generated by applying the first parameter to the first glyph; and
the second modified glyph is generated by applying the second parameter to the second glyph.

20. The user device of claim 16, wherein:
the first glyph has a first surface area;
the modified glyph data is representative of a glyph having a second surface area; and
the processor is further configured to execute the computer-executable instructions to generate alert data indicative of a determination that the second surface area is equal to or more than a threshold percentage of the first surface area.

* * * * *